June 2, 1953 W. H. SHELDON 2,640,203

CABINET TYPE FOLDING CRIB

Filed June 11, 1948 4 Sheets-Sheet 1

INVENTOR.

Werner H. Sheldon

BY

Howard P. King

ATTORNEY

June 2, 1953 W. H. SHELDON 2,640,203

CABINET TYPE FOLDING CRIB

Filed June 11, 1948 4 Sheets-Sheet 2

INVENTOR.

Werner H. Sheldon

BY

Howard P. King

ATTORNEY

June 2, 1953 W. H. SHELDON 2,640,203

CABINET TYPE FOLDING CRIB

Filed June 11, 1948 4 Sheets-Sheet 3

INVENTOR.
Werner H. Sheldon
BY
Howard P. King
ATTORNEY

CABINET TYPE FOLDING CRIB

Filed June 11, 1948 4 Sheets-Sheet 4

INVENTOR.
Werner H. Sheldon
BY
Howard P. King
ATTORNEY

Patented June 2, 1953 2,640,203

UNITED STATES PATENT OFFICE 2,640,203

CABINET TYPE FOLDING CRIB

Werner H. Sheldon, New York, N. Y.

Application June 11, 1948, Serial No. 32,299

3 Claims. (Cl. 5—100)

This invention relates to furniture, and more particularly to an improved child's crib, which may also be converted into a cabinet.

An object of the invention is to provide a child's crib having a front side or gate which may be moved from upright operative position to a substantially horizontal position underneath the crib's mattress carrying frame, so as to enable the mother or nurse to have ease and freedom in sitting on the mattress and in bending over and attending the child, and to permit making up and adjusting and turning of the mattress more easily and quickly.

Another object of the invention is to provide slidable means for moving the front gate from upright position or from a position underneath the frame to a position to overlie the mattress or its frame in horizontal position.

A further object of the invention is to provide a foldable crib having a frame foldably connected to an upright rear side or gate, which with the front gate overlying the mattress or frame in horizontal position may be quickly and easily raised and pivoted from horizontal position to upright position alongside the upright rear gate, the front gate being between the rear gate and mattress or its frame.

Yet another object of the invention is to provide a folded crib unit, comprising the front and rear gates, mattress or frame in upright position, which may be removably supported from the crib's left and right side members, or enclosed by said side members and top of the crib to form a cabinet, or which may be removed or replaced as a unit from or to the crib's said side members.

Other objects of the invention are to provide a separate portable crib unit which may be moved or shipped with ease and inexpense; to provide right and left side members for the crib which may be converted easily and quickly into doors of a cabinet, and which provide more height and area for the crib in open or operative position; to provide a crib which may be quickly and easily converted into a cabinet of compact size and pleasing appearance.

Other objects of the invention will appear as the description proceeds, both by direct recitation thereof and by implication from the context.

Referring to the accompanying drawings in which like numerals of reference indicate similar parts throughout the several views.

Figures 7, 8, 9, 10, 11, 20:
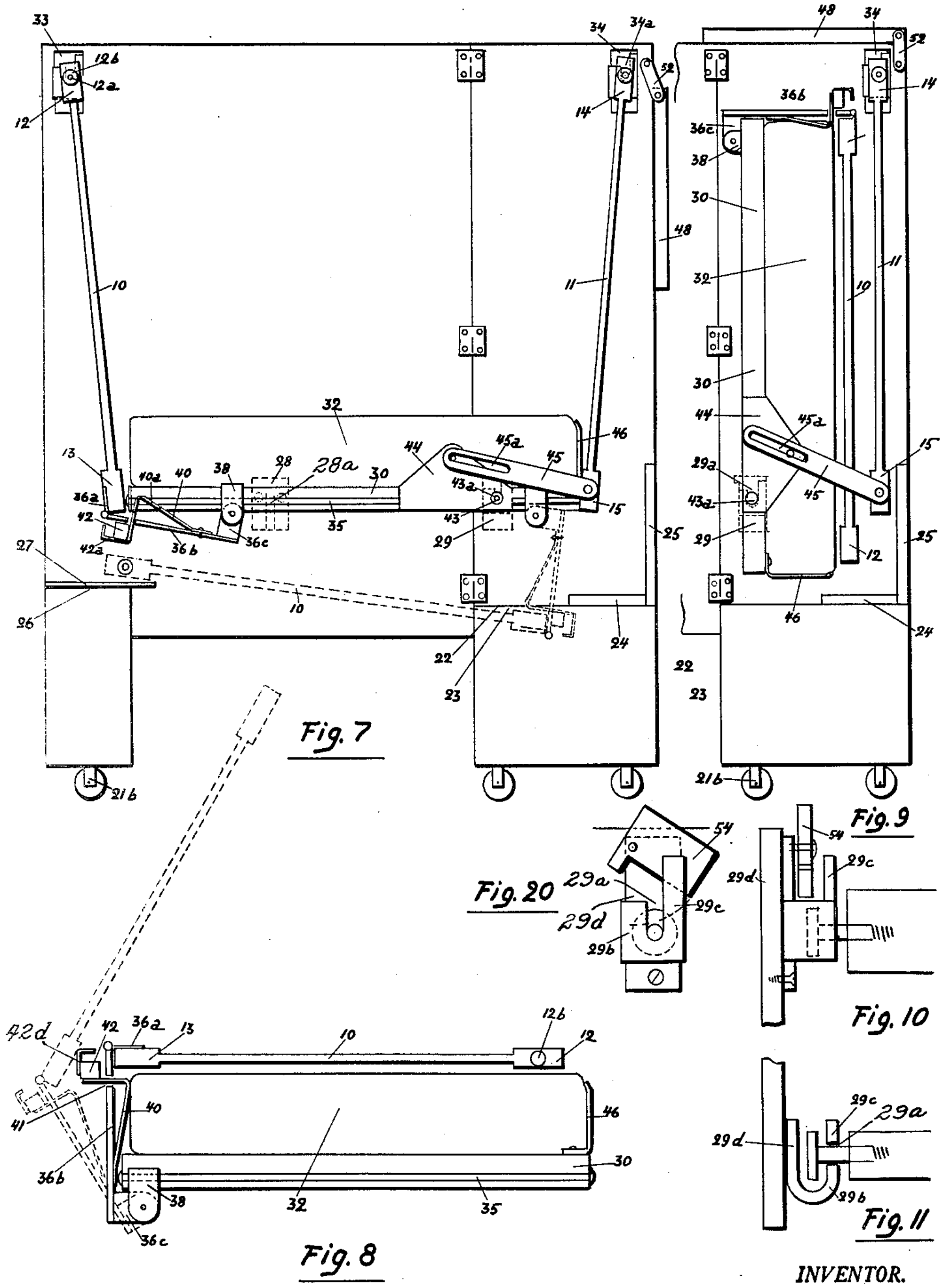
Figure 7 is a cross-sectional view of Fig. 1.
Figure 8 is a cross sectional view of Fig. 7, but showing the front gate being swung to overlie the top surface of the mattress.
Figure 9 is a cross sectional view of the crib and cabinet in the upright position of Fig. 4.
Figure 10 is a side view of the brackets and the top transverse members of the front and rear rails or gates showing how they are removably supported on the side members.
Figure 11 is a plan view of Fig. 10.
Figures 12, 13, 14, 15, 16, 17, 18, 19:
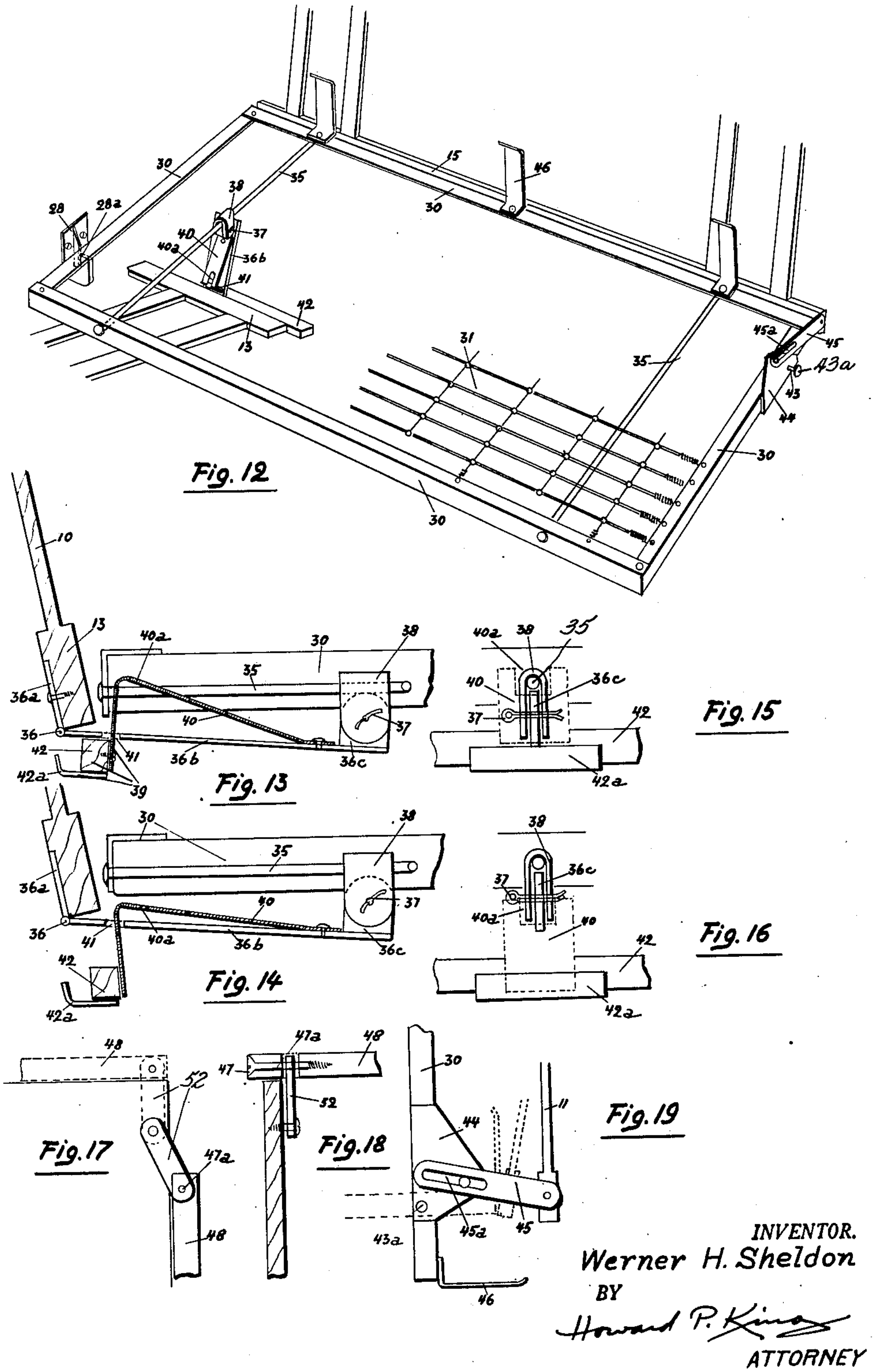
Figure 12 is a perspective view of the mattress frame with its attachments.
Figure 21:
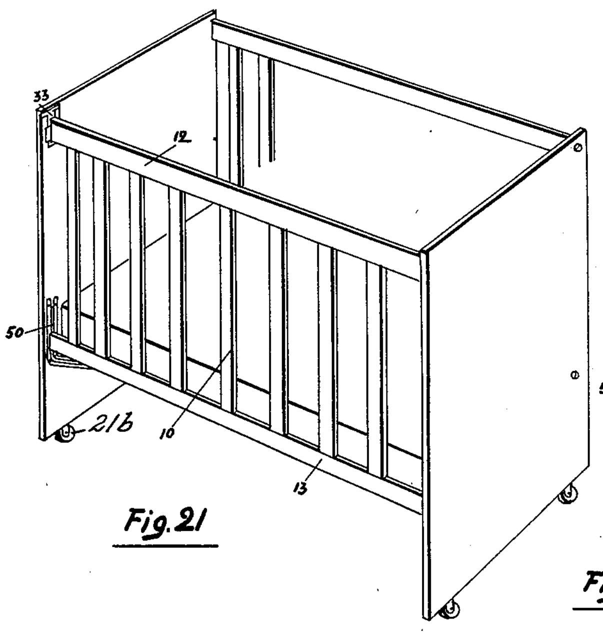
Figures 23, 24, 25, 27:
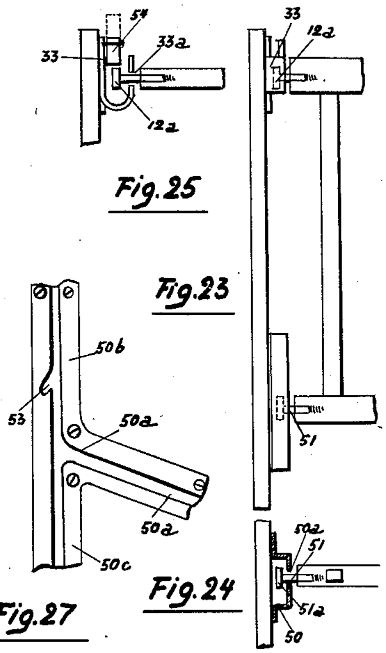
Figure 22:
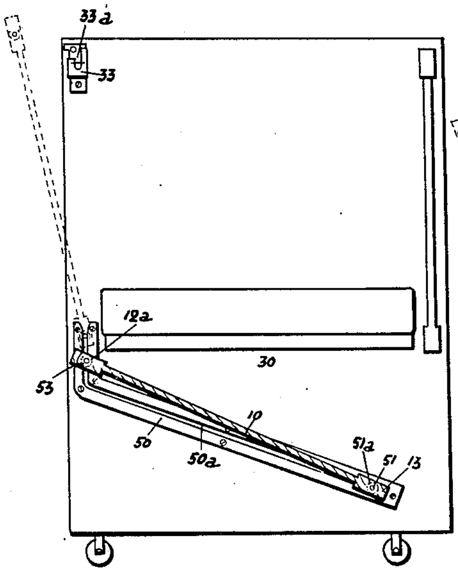
Figure 26:
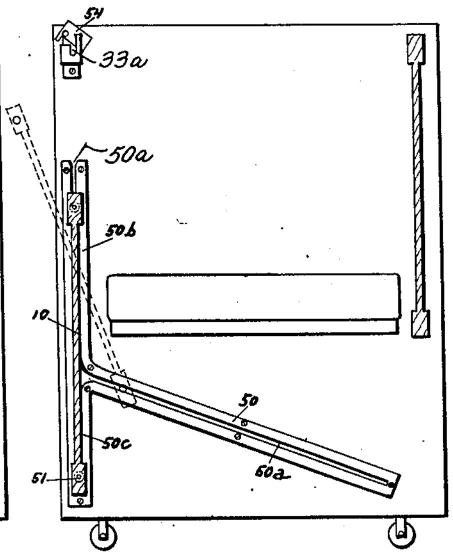

Figure 13 is a side sectional view of the locking and sliding device for the front gate in locked position; Figure 14 is the same view as Fig. 13, but in open or released position; Figure 15 is a cross sectional view of Fig. 13, and Figure 16 is a cross sectional view of Fig. 14. Figs. 13 to 16 inclusive show the catch for locking and releasing the front gate to the mattress frame, and the sliding means to move the front gate underneath the frame;

Figure 17 is a side view of the means for moving the top of the cabinet; Figure 18 is a plan view of Fig. 17; and Figure 19 is a front elevation of the linkage between the bottom transverse member of the rear gate and the rear of the mattress frame in upright position, as shown in Fig. 9, and the movement of the rear gate; and Figure 20 is a front view of the supporting brackets for the front gate, and locking means for same in open position, similar brackets and locking means being employed for the rear gate and frame;

Figure 21 is a perspective view of a non-foldable crib showing another embodiment for moving the front gate underneath the frame; Figure 22 is a cross sectional view of the embodiment of Fig. 21, but with the front gate underneath the frame being moved from upright position; Figure 23 is a side view of the supporting and sliding pins for the front gate; Figure 24 is a cross sectional view of the sliding pins of Fig. 23; and Fig. 25 is a plan view of the supporting bracket and lock for the top transverse member of the front gate; and Figure 26 is a side sectional view of a further embodiment showing the front gate being moved either as a drop gate vertically or underneath the frame in a substantially horizontal position; and Figure 27 is a plan view of the vertical and substantially horizontal channel of Fig. 26.

Figures 1, 2, 3, 4, 5, 6:
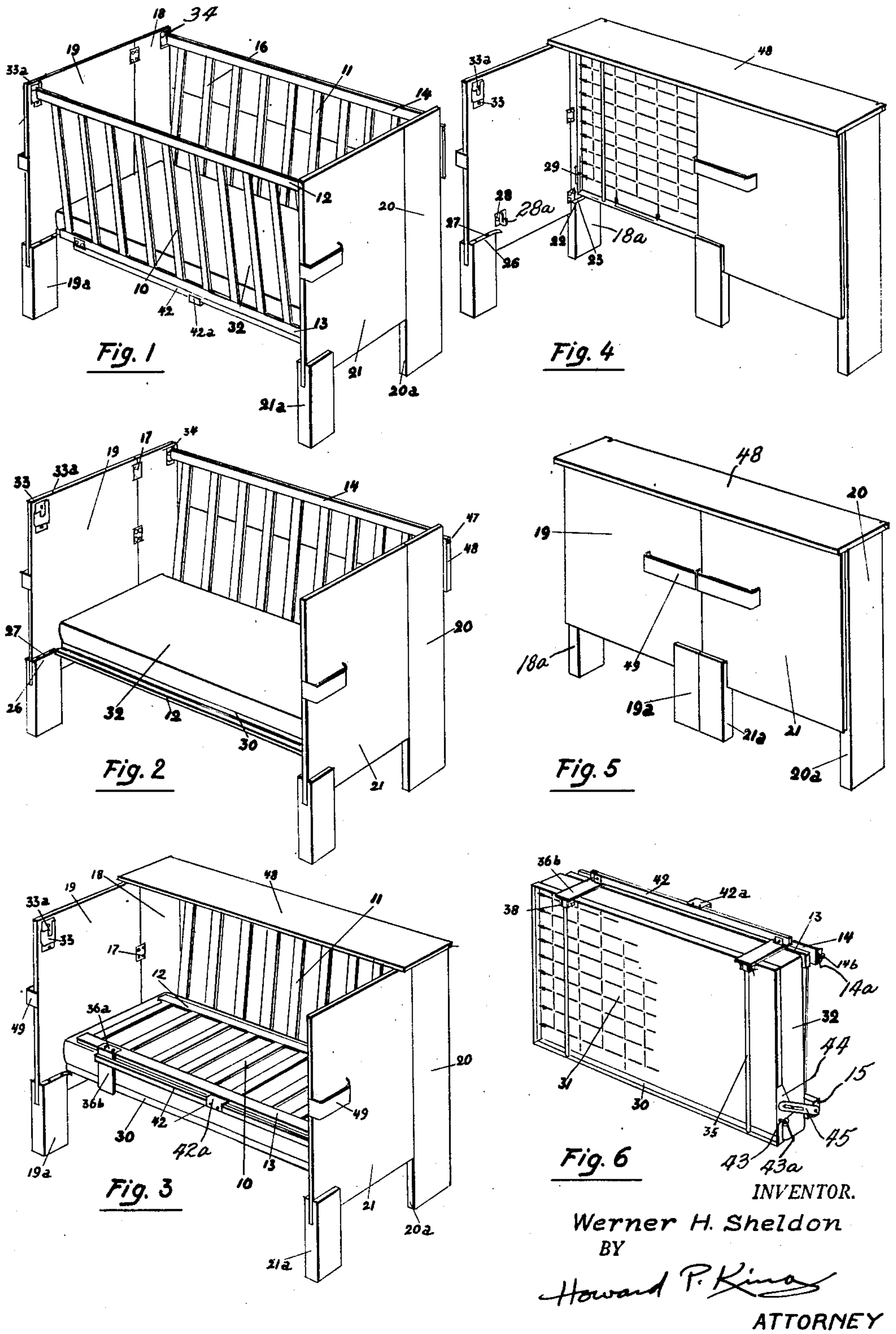
Figure 1 is a perspective view of an article of furniture embodying my invention and set up in open or operative position for use in its capacity as a child's crib.
Figure 2 is a perspective view of the crib with the front rail moved from upright position of Fig. 1 to a substantially horizontal position underneath the mattress frame.
Figure 3 is a perspective view of the crib with the front rail moved to a position to overlie the mattress in horizontal position, and showing the sliding means which hold the mattress as well as its sheets and blankets securely in place.
Figure 4 is a perspective view of the crib unit comprising the front gate, mattress frame, mattress and rear gate in upright position with the right front side section being moved in to form a door, and the movable top brought from the rear or back to the top of the cabinet.
Figure 5 is a perspective view of the cabinet, which may or may not contain the crib unit, and with its left and right front side sections being moved in to form doors and legs, and the movable top brought from the back to form the top of the cabinet.
Figure 6 is a perspective view of the crib unit.

In the embodiment of the invention illustrated in Figs. 1 to 20 of the drawings, the reference numbers 10 and 11 are respectively the front and rear side members of the crib, herein preferably called "gates." Fig. 1 shows the crib in open or operative position. Front gate 10 has a top transverse member 12, and a bottom transverse member 13. Rear gate 11 has a top transverse member 14 and a bottom transverse member 15. Both gates have a plurality of spaced bars 16. Protruding from each end of members 12 and 14 are respective pins 12*a* and 14*a*, each having a head 12*b*. There are right and left side members, each formed in two sections, hinged together as at 17, and forming a left rear side section 18, a left front side section 19, a right rear side section 20, and a right front side section 21. Each of these sections is extended downwardly to form respective legs 18*a*, 19*a*, 20*a*, and 21*a*, which may be provided with casters and the like 21*b*.

Rear legs 18*a* and 20*a* each have as at 22 a projection or ledge 23 extending inwardly and below the bottom transverse member 15, on which is firmly connected a narrow shelf 24 joined at right angles to a back 25. Front legs 19*a* and 21*a* each have a projection or ledge 26 extending inwardly and below bottom transverse member 13, on which is affixed a slide 27, which slide extends slightly inward and beyond ledge 26.

Sections 19 and 21 are each provided, slightly above ledges 26, with a bracket 28, provided with a suitable inwardly projecting perpendicular slot or groove 28*a*. Sections 18 and 20 are each provided with a bracket 29, slightly above ledges 23, having a suitable perpendicular slot or groove 29*a* formed by two legs 29*b* and 29*c* of a plate 29*d* bent from said bracket 29, and forming a narrow space between legs 29*b* and 29*c* and plate 29*d*.

As shown in Fig. 12, an angle frame 30 of a bed spring 31 removably fits or rests in grooves or slots 28*a* and also in slots 29*a* by pins 43 each having a head 43*a*, said pins being carried by plates 44 affixed to frame 30, the said frame, when in horizontal position being adjacent bottom transverse members 13 and 15. The bed spring 31 carries a mattress 32. The frame and its bed spring and mattress are thus removably supported by brackets 28 and 29. As shown in Figs. 1 to 3 the side members have more height and width than the rails or gates, and the gates are slanted down towards the frame, which gives more area, freedom and protection for the child.

To removably support front gate 10, I provide in the top front corners of sections 19 and 21, brackets 33 each similar to brackets 29, and having a perpendicular slot 33*a* into which pins 12*a* move perpendicularly, the heads 12*b* moving in the space between slot 29*a* and bracket 29. To removably support rear gate 11, I provide in the top rear corners of rear sections 18 and 20, brackets 34, similar to brackets 29 and 33, each having a perpendicular slot 34*a* into which pins 14*a* move perpendicularly, the heads 14*b* moving in the space between slot 34*a* and bracket 34.

To enable a person to be seated with full freedom on the mattress, or to adjust the mattress, or to change the sheets and bedding, and for other purposes in attending the child, I swing the front gate 10 completely underneath the frame 30, without affecting or changing any other parts of the crib, as shown in Fig. 2. This is accomplished quickly and easily by a pair of spaced slide bars 35 affixed on the under side of frame 30, as shown in Fig. 12. A pair of hinges 36, each having two parts, one part 36*a* being affixed to the front face of transverse member 13, and the other part comprising an elongated plate 36*b* extending, when the front gate 10 is in upright position, inwardly and below the front part of the slide bars 35, the free end of plate 36*b* having an upward stud 36*c*, on which is attached by pin 37 a free moving or swinging slider 38, which is looped over slide bar 35.

To swing the front gate below the frame, a catch 39, hereafter described, is first released, then the pins 12*a* are lifted up and out of slots 33*a*, and the front gate being free, except for attachment to hinges 36, is then swung out and down and under the frame 30, and slid by the sliders 38 on the slide bars 35 from the front to the rear of the frame, the ends of transverse member 12 and its pins 12*a* resting on the slides 27, as shown in Figs. 2 and 7.

To convert the crib into an article of furniture, such as a cabinet with legs, and occupying a much smaller space than the open crib and adapted to be moved against a wall, the operator, when the front gate is in upright position of Fig. 1, releases the catch 39, as hereafter described, and the pins 12*a* are lifted up and out of slots 33*a*, as heretofore explained, and then moves and places the front gate completely over the top surface of the mattress or the bed spring, the hinge plates 36*b* being pulled up into a vertical position tightly against the front edge of the mattress or frame, the top transverse member 12 being adjacent bottom transverse member 15, as shown in Fig. 3. The front gate, mattress and/or frame now may be lifted and swung at one time rearwardly to a vertical position alongside the vertical rear gate, as shown in Fig. 4. In so doing, the front part of frame 30 is lifted out of slots 28*a* of brackets 28, the rear part of frame 30 being pivoted by pins 43 in slots 29*a* of brackets 29. Links 45 are each pivotally connected at one end to the ends of member 15 and at its opposite end pivotally to the plate 44, at which opposite end the link has an elongated slot 45*a*. When in open or operative position, or when the front gate is held below the frame as heretofore described, the link 45 and its pivots are as shown in Figs. 7 and 12; and when the front gate, bed spring and/or mattress are swung at one time to upright position, as shown in Fig. 9, the links 45 and its pivots are in the position as shown in Figs. 9 and 19. A plurality of fingers 46 are each affixed at one end to the rear of frame 30, as shown in Fig. 12, which hold the mattress in place and which presses the movable member 15 towards the back 25, as shown in Fig. 9, when the said members are swung to upright position.

In this upright position, the front gate, bed spring and its frame, with or without the mattress, and the rear gate now comprise a folded crib unit, which may be permitted to remain in that position and be enclosed by the front sections, as shown in Figs. 4 and 5, or the said crib unit may be lifted out and removed entirely from the side members. In so doing, pins 14a are lifted up and out of slots 34a, and pins 43 are lifted up and out of slots 29a simultaneously. Whether this crib unit is removed or not, the front sections of the side members may be moved in to form doors of a cabinet having a top cover 48, which is foldably connected by links 52 each pivotally connected at one end to the top inside corner of rear sections 18 and 20 and at its opposite end to the shank 47a of a screw 47 inserted in the edge of cover 48. By this arrangement the cover 48 may lie flat against the rear edges of said rear sections, as shown in Figs. 1, 2, or swung over and to rest on the top edge of said rear sections, thus forming a top or cover for the cabinet, as shown in Figs. 3 and 4. And as shown in Figs. 4 and 5, the front sections 19 and 21 may be moved by handles 49 in towards the upright bed spring to form the doors of the cabinet. It is obvious that the cabinet may be converted into a crib by lifting the portable crib unit in between the back and doors, fitting pins 43 into slots 29a and pins 14a into slots 34a. The doors and side members may be provided with drawers (not shown), and shelves (not shown) may be provided between the rear sections 18 and 20, thus providing a serviceable cabinet when a crib is not needed or required.

The front gate 10 may be provided with a catch 39 to lock or secure it in upright operative position. The catch has a pair of L-shaped spring detents 40 each affixed at one end on the upper surface of the rear end of hinge plate 36b, and gradually rising above said hinge plate 36b, and bent downwardly to form a forward end passing through an opening 41 at the other end of hinge plate 36b, at which forward end it is affixed to the inner surface of a transverse bar 42 directly underneath transverse member 13 when in locked position, and having a center finger piece 42a. As shown in Figs. 12, 13, 14, at said forward end and above the opening 41 each detent has an L-shaped slot 40a, through which, when the catch is in locked position, the forward part of slide bar 35 passes, the said raised slot 40a also locking into the angle of angle frame 30. By pressing the finger piece 42a downwardly the spring detents are pressed down and the slots 40a are taken out of slide bars 35 and angle of angle frame 30, and the operator then moves or slides the front gate held by hinges 36 outwardly and away from frame 30. When the front gate 10 is in released position, and in order to lock the front gate, the finger piece 42a is moved toward frame 30, and pressed against the frame 30, which will slightly depress the forward parts of said detents 40 and cause them to be forced under and into the angle of angle frame 30 with the slide bars in between the slots 40a to lock or hold the front gate securely in upright position.

In Figs. 21 to 27, another embodiment for moving the front gate 10 completely underneath frame 30 is shown for a non-foldable crib or cabinet. An L-shaped bracket 50 is affixed at its ends to the inner surface of each side member of the crib. Between its ends, each bracket 50 has an L-shaped slot or channel 50a, the shorter part of the L-shaped channel extending a short distance above the frame 30, the longer part extending and slanting downwardly, as shown in Fig. 22. At the ends of transverse member 13 of front gate 10 are provided pins 51 having heads 51a, which pins fit into and slide in the L-shaped channel 50a, the heads 51a moving in a narrow space provided between the channel and the side members. The heads are large enough to prevent its pins from falling or being pulled out of slot or channel 50a. When in upright position the front gate 10 is removably supported by pins 12a in slots 33a of brackets 33, and pins 51 rest in the bend of the L-shaped channel 50a formed by the shorter and longer parts of the said channel. To move the front gate underneath the frame in this embodiment, the pins 12a are lifted up and out of slots 33a, and the pins 51 are simultaneously moved up into the shorter part of the L-shaped channel and then the front gate is free to be moved by pins 51 in channel 50a from the front to the rear part of frame 30 to a substantially horizontal position underneath the frame, the pins 12a resting in notches 53 on the outer end of the L-shaped brackets 50. To move the front gate back to upright position, the said gate is pulled out from underneath the frame, the pins sliding outwardly and upwardly in channel 50a, and the gate 10 then swung up and then the pins 12a fitted into slots 33a.

In Figs. 26 and 27, I show a further embodiment for either moving the front gate 10 horizontally underneath the frame, or vertically as a drop gate. In this embodiment the shorter part of the channel 50a is enlarged upwardly into channel 50b, and another lower vertical channel 50c is provided on the side members. The channel parts 50b and 50c form a vertical channel, having a length somewhat less than the height of the front gate. By this construction the front gate may be moved vertically as a drop gate or swung underneath the frame as desired.

As shown in Fig. 20, brackets 29, 33, 34 may each be provided with a locking plate 54 pivoted at one end to the top part of its respective bracket, and when the plate 54 is moved down its opposite end closes the slot end or opening of the respective brackets, preventing the respective pins moving in each bracket from coming out therefrom. By moving or pivoting plate 54 upwards the respective slot ends of the respective brackets are open and their respective pins may be inserted or taken out therefrom.

While my invention is shown as applied to a child's crib, it may also be applied to beds as such, and also to toy cribs and beds. It will be understood that only a preferred embodiment of my invention has been shown and described, and that the details herein disclosed may be varied to suit particular purposes without departing from the essence of the invention, as the broad concept of the invention contemplates all changes and modifications as may fairly come within the scope of the following claims.

I claim:

1. A crib comprising front and rear gates and side members in upright position, a mattress supporting frame in horizontal position between said gates and members, said front and rear gates each having top and bottom transverse members, means removably supporting the top transverse members of said gates on said side members, means foldably connecting said bottom transverse member of the rear gate to said frame, slides on the under side of said frame, sliders for said slides connected to said bottom transverse member of the front gate so that when the top transverse member of the front gate is removed from the side members the said front gate may be moved to horizontal position over or under said frame on said slides.

2. A crib comprising front and rear gates and side members in upright position, a mattress supporting frame in horizontal position between said gates and members, said front gate having top and bottom transverse members, means removably supporting the top transverse member on said side members, slides on the under side of said frame, sliders for said slides, hinges connecting said sliders to said bottom transverse member, and a catch carried by said slider and operative to stop the slider from movement to the full length of the slide and in position to hold the bottom transverse member adjacent to the frame, said catch being releasable to thereby permit completion of movement of the slider on the slide and spacing of the said bottom transverse member away from the frame.

3. A crib comprising front and rear gates and side members in upright position, a mattress supporting frame between said gates and members, slide rods on the under side of said frame extending in a direction from gate to gate, a slider on each slide rod, a plate pivoted at one end of itself to said slider with the plate and slide rod both offset from the pivot thereby enabling the plate to be swung upwardly at the front of the frame opposite the end of the slide rod, and hinges on the other ends of said plates, said hinges being attached to one of the gates.

WERNER H. SHELDON.

References Cited in the file of this patent

UNITED STATES PATENTS

| Number | Name | Date |
|---|---|---|
| 1,143,881 | Appugliese | June 22, 1915 |
| 1,201,923 | Bent | Oct. 17, 1916 |
| 1,293,001 | Bent | Feb. 4, 1919 |
| 1,391,566 | Musselman | Sept. 20, 1921 |
| 1,516,322 | Beaucoudray | Nov. 18, 1924 |
| 1,612,080 | Waddington | Dec. 28, 1926 |
| 1,733,636 | Vollmer | Oct. 29, 1929 |
| 1,990,959 | Saperstein | Feb. 12, 1935 |
| 2,430,704 | Brown | Nov. 11, 1947 |

FOREIGN PATENTS

| Number | Country | Date |
|---|---|---|
| 308,881 | Great Britain | Apr. 4, 1929 |
| 1,488 | Switzerland | Apr. 30, 1888 |